W. F. ADAMS.
FLUSHING TANK.
APPLICATION FILED APR. 17, 1906.
914,011.
Patented Mar. 2, 1909.
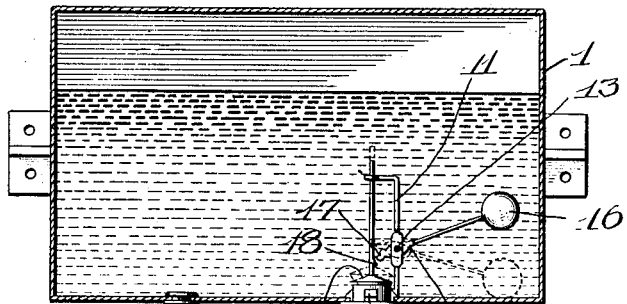
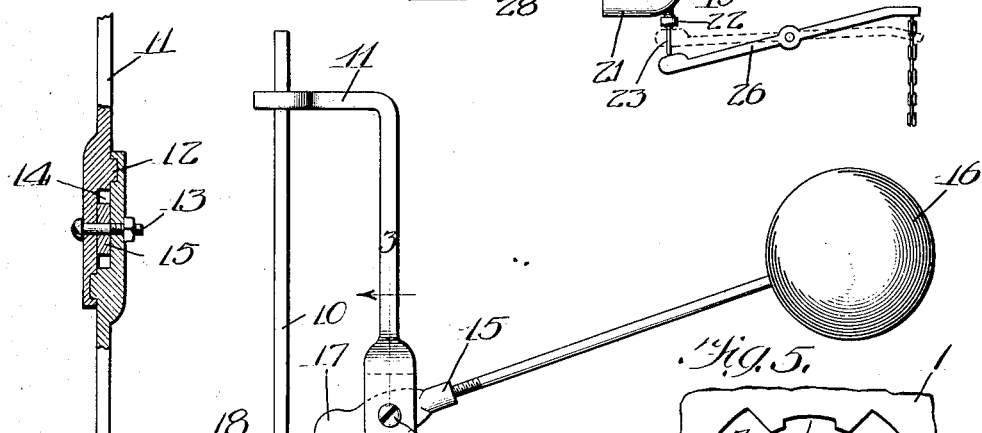
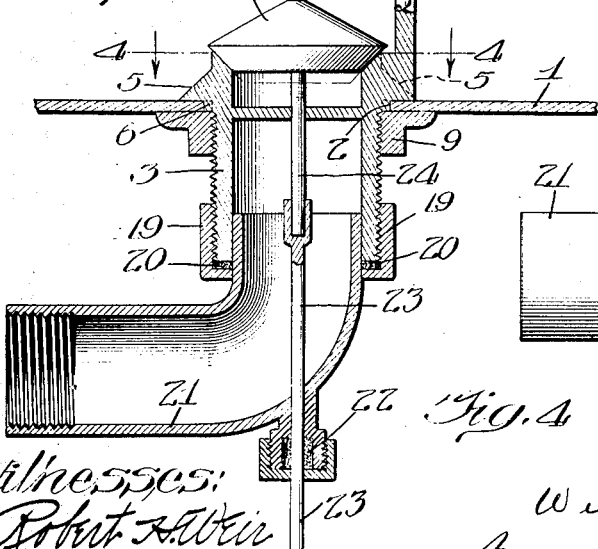
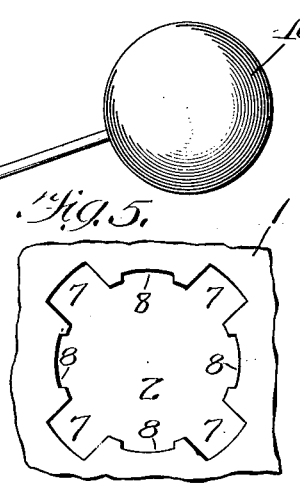
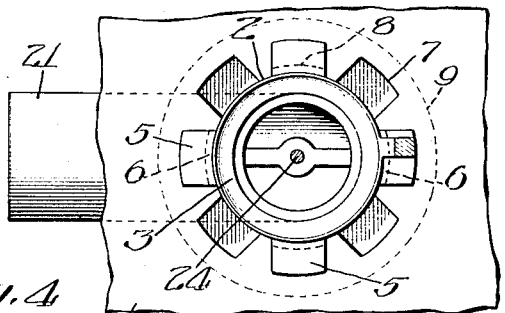

UNITED STATES PATENT OFFICE.

WILLIAM FREDERICK ADAMS, OF MILWAUKEE, WISCONSIN.

FLUSHING-TANK.

No. 914,011.          Specification of Letters Patent.          Patented March 2, 1909.

Application filed April 17, 1906. Serial No. 312,222.

*To all whom it may concern:*

Be it known that I, WM. FREDERICK ADAMS, a citizen of the United States, residing at Milwaukee, in the county of Milwaukee and State of Wisconsin, have invented new and useful Improvements in Flushing-Tanks, of which the following is a full, clear, concise, and exact description, reference being had to the accompanying drawing, forming a part of this specification.

My invention relates to improvements in flushing tanks, its object being to provide certain improvements in check valves for such tanks.

In order to explain my invention, I have illustrated a flushing tank which embodies the preferred form of the same.

The views in the accompanying drawing are as follows:

Figure 1 is a sectional view through the tank showing the valve mechanism in elevation. Fig. 2 is a vertical sectional view through the valve mechanism. Fig. 3 is a sectional view on the line 3—3 of Fig. 2. Fig. 4 is a plan view of the tube forming the valve seat, said view being taken on the line 4—4 of Fig. 2. Fig. 5 is a plan view of a part of the bottom of the tank showing the opening for receiving the tube forming the valve seat.

I preferably provide an airtight tank 1 which may be fastened upon a support by any suitable means. The tank is preferably formed from sheet metal so that it may be cheaply and easily constructed. The bottom of the tank is preferably provided with an opening or hole 2, such as is illustrated in Fig. 5, in which is placed a tube 3, the upper end of which forms a seat for a check valve 4. The check valve is preferably provided with an incline face which is adapted to bear against an incline face upon its seat. These faces are so inclined that the valve may be readily raised from its seat, and the same are so fitted to each other that the valve will seal without the use of a packing. The valve is preferably provided with a conical top so that it may be readily raised from its seat against the pressure of the water within the tank.

The tube 3 is preferably provided with four radially extending lugs 5 beneath each of which is arranged a projection 6. In order to place the tube 3 in position, the upper end thereof is inserted into the opening 2, the lugs 5 being passed through recesses 7. The tube is then turned until the lugs 5 are arranged between the recesses 7. The tube is then drawn downwardly to bring the projections 6 into the notches 8, and also bring the lugs 5 into engagement with the bottom of the tank. The projections 6 prevent the tube 3 from turning after it is put in place. Upon the tube 3 is threaded a nut 9 which clamps said tube 3 in place, and also serves to close the recesses 7.

The check valve 4 is preferably mounted upon a square rod 10, which extends above said valve. The tube 3 preferably carries a bracket 11 by means of which the upper end of the rod 10 is guided. The bracket 11 is preferably made in two parts, each of which is provided with a projection 12, which is adapted to fit into a corresponding recess in the other part, as illustrated in Fig. 3. The two parts of the bracket are preferably held together by means of a bolt 13. Between the two parts of the bracket is formed a slot 14, through which extends a lever 15, which is pivoted upon the bolt 13. The outer end of the lever preferably carries a float 16 and the inner end thereof carries a pawl or latch 17 which is preferably adapted to engage a lug or projection 18 upon the valve rod.

Upon the lower end of the tube 3 is threaded a coupling 19, and between said tube and said coupling is compressed a packing 20 which serves to hold one end of an elbow 21, which is adapted to be connected to a suitable discharge pipe. The elbow 21 preferably carries a packing-box 22, through which extends an operating rod 23. The upper end of the operating rod is preferably provided with a socket which receives a rod 24 projecting from the bottom of the check valve. By means of the operating rod 23, the check valve 4 may be raised from its seat. I may employ a pivoted lever 26 or any other suitable means to actuate the operating rod 23.

The float 16 and the bracket 11 are preferably so constructed and shaped that the same may be inserted through the opening 2.

It will be noted that I provide a valve mechanism which is a unitary structure and which may be bodily placed in position in the tank. I am therefore enabled to assemble the valve mechanism and put it in place without difficulty.

The tank may be connected to a source of water supply by means of a tube 27 and an elbow 28, which may be constructed and arranged so as to be held in place in the same manner as the tube 3 and elbow 21.

I shall now describe the operation of my device. When the tank is empty, water will enter the same from the source of supply. When the water rises in the tank, it will compress the air above the same until the pressure of the air becomes equal to the pressure of the source of supply, and then the inflow of water will cease. In order to discharge the water from the tank, the check valve 4 may be raised from its seat by means of the lever 26. When the valve is raised, the projection 18 will engage the underside of the pawl 17, thereby forcing the float 16 downwardly in the tank until said projection may pass beyond the pawl. As soon as the pawl is disengaged from the projection 18, the float 16 will be raised, thereby bringing the pawl 17 in a position to engage the projection 18 so as to hold the check valve 4 in an elevated position. The pressure upon the water will cause it to be discharged rapidly. The float 16 will be lowered as the water is discharged, and, in consequence, when the tank is emptied, the pawl 17 will be disengaged from the projection 18, thereby permitting the check valve to descend until it rests upon its seat to close the discharge outlet.

It will be noted that I provide a structure wherein the water will be placed under pressure so as to be rapidly discharged from the tank and also wherein the check valve will be automatically kept open until the tank is emptied.

It will, of course, be understood that various changes may be made in the apparatus shown in the drawing without in any way departing from my invention as defined by the claims appended hereto.

Having thus described my invention what I claim as new and desire to secure by Letters Patent is:

1. The combination with an air-tight tank wherein water is placed under pressure by compression of the air above the same, said tank having a suitable inlet port and an outlet port, said outlet port being arranged in its bottom, of a unitary valve mechanism comprising a tubular member placed in said outlet port having connection with a suitable discharge pipe, means for holding said member in position and forming a water tight connection between the same and the tank, a valve having a seat formed on said member, a rod extending downwardly from said valve and passing through the wall of said tubular member, a water tight joint between said rod and the wall of said member, a bracket extending upwardly from said tubular member, a guide-rod extending upwardly from said valve and guided by said bracket, a rod pivoted upon said bracket, a float carried by one end of said rod, a dog carried by the other end of said rod, and adapted to hold said valve in a raised position until said float descends to its lower position when the tank is emptied, the parts of said valve mechanism being so formed and associated that said mechanism may be first assembled and then bodily placed in position in said tank, said float and said bracket being adapted to be inserted through said discharge outlet substantially as described.

2. The combination with a tank having a discharge outlet provided with radial notches in combination with a valve mechanism comprising a tube adapted to be inserted into said discharge outlet, lugs formed upon said tube adapted to pass through said notches and engage the inside of said tank, a ring threaded upon said tube and adapted to engage the outside of said tank to form a water tight connection between said tank and said tube, an elbow inserted in the lower end of said tube, a coupling threaded upon said tube for holding said elbow in said tube and forming a water tight connection, a packing arranged in said coupling, a valve having a conical face and resting upon a conical seat formed upon the top of said tube, said valve having a conical head, an operating rod extending downwardly from said valve and passing through a water tight joint in said elbow, a two part bracket extending upwardly from said tube, a guide rod extending upwardly from said valve and guided by said bracket, a float rod pivoted between the two parts of said bracket, a float carried by one end of said float rod, a dog arranged upon the other end of said float rod, and a part connected with said valve adapted to be engaged by said dog when said valve is raised to hold said valve in a raised position until said float descends.

In witness whereof, I have hereunto subscribed my name in the presence of two witnesses.

WM. FREDERICK ADAMS.

Witnesses:
CHAS. F. ADAMS,
A. C. BURGESS.